US009358506B2

(12) United States Patent
Cheiky

(10) Patent No.: US 9,358,506 B2
(45) Date of Patent: Jun. 7, 2016

(54) HYDROGEN SEPARATION FROM SYNTHESIS GAS NEAR STP

(71) Applicant: V-GRID Energy Systems, Camarillo, CA (US)

(72) Inventor: Michael Cheiky, Camarillo, CA (US)

(73) Assignee: V-GRID ENERGY SYSTEMS, Camarillo, CA (US)

( * ) Notice: Subject to any disclaimer, the term of this patent is extended or adjusted under 35 U.S.C. 154(b) by 0 days.

(21) Appl. No.: 14/463,619

(22) Filed: Aug. 19, 2014

(65) Prior Publication Data

US 2015/0059575 A1  Mar. 5, 2015

Related U.S. Application Data

(60) Provisional application No. 61/871,828, filed on Aug. 29, 2013.

(51) Int. Cl.
| | | |
|---|---|---|
| B01D 69/02 | (2006.01) |
| B01D 71/02 | (2006.01) |
| B01D 71/36 | (2006.01) |
| C01B 3/00 | (2006.01) |
| F01K 15/00 | (2006.01) |
| C01B 3/50 | (2006.01) |
| B01D 53/22 | (2006.01) |
| B01D 67/00 | (2006.01) |
| B01D 69/14 | (2006.01) |

(52) U.S. Cl.
CPC .............. *B01D 69/02* (2013.01); *B01D 53/228* (2013.01); *B01D 67/0041* (2013.01); *B01D 67/0079* (2013.01); *B01D 69/148* (2013.01); *B01D 71/021* (2013.01); *C01B 3/501* (2013.01); *F01K 15/00* (2013.01); *B01D 71/36* (2013.01); *B01D 2256/16* (2013.01); *B01D 2257/504* (2013.01); *B01D 2325/04* (2013.01); *B01D 2325/30* (2013.01); *B01D 2325/40* (2013.01); *C01B 2203/0405* (2013.01); *Y02C 10/10* (2013.01); *Y02P 20/152* (2015.11)

(58) Field of Classification Search
CPC .. B01D 53/22; B01D 53/228; B01D 67/0041; B01D 67/0079; B01D 69/02; B01D 69/148; B01D 71/021; B01D 71/36; B01D 2256/16; B01D 2257/504; B01D 2325/04; B01D 2325/16; B01D 2325/30; B01D 2325/40; C01B 3/501; C01B 3/503; C01B 3/505; C01B 2203/0405; F01K 15/00
USPC .............................................. 96/4, 11; 95/55
See application file for complete search history.

(56) References Cited

U.S. PATENT DOCUMENTS

| | | | | |
|---|---|---|---|---|
| 5,431,864 A | * | 7/1995 | Rao ........................ | B01D 53/22 96/11 |
| 6,511,521 B1 | * | 1/2003 | Parchamazad ......... | B01D 53/22 95/55 |
| 7,375,142 B2 | | 5/2008 | Pearson | |
| 7,947,114 B2 | | 5/2011 | Hagg et al. | |

(Continued)

OTHER PUBLICATIONS

Patent Cooperation Treaty, International Search Report for PCT/US2014/051761, Nov. 19, 2014, pp. 1-2.

*Primary Examiner* — Jason M Greene
(74) *Attorney, Agent, or Firm* — Sheppard Mullin Richter & Hampton LLP

(57) ABSTRACT

A hydrogen separation system and membrane is described for extracting hydrogen from gasifier streams at near atmospheric pressure and ambient temperature conditions. The system can be inserted between a small gasifier and an internal combustion engine which runs a genset to optionally co-produce hydrogen and electricity.

19 Claims, 7 Drawing Sheets

(56) References Cited

U.S. PATENT DOCUMENTS

| | | | |
|---|---|---|---|
| 2003/0089228 A1* | 5/2003 | Kulprathipanja | B01D 53/228 95/45 |
| 2004/0142220 A1* | 7/2004 | Brenner | B01D 53/22 429/411 |
| 2004/0182242 A1 | 9/2004 | Mitani et al. | |
| 2007/0010588 A1* | 1/2007 | Pearson | C10K 1/16 518/701 |
| 2007/0017861 A1* | 1/2007 | Foley | B01D 53/228 96/4 |
| 2007/0269690 A1* | 11/2007 | Doshi | C01B 3/56 48/197 R |
| 2008/0112867 A1* | 5/2008 | Wei | B01J 19/2475 423/224 |
| 2009/0212469 A1* | 8/2009 | Thottupurathu | B01D 71/36 264/639 |
| 2010/0104845 A1* | 4/2010 | MacLennan | B01D 67/0004 428/221 |
| 2012/0017510 A1* | 1/2012 | Leveson | C10J 3/26 48/76 |
| 2013/0011756 A1* | 1/2013 | Weaver | H01M 8/06 429/416 |
| 2014/0030615 A1* | 1/2014 | Pollica | B01D 53/229 95/55 |

* cited by examiner

HYDROGEN SEPARATION FROM SYNTHESIS GAS NEAR STP

RELATED APPLICATIONS

This application claims priority to U.S. Provisional Patent Application No. 61/871,828 filed on Aug. 29, 2013, the content of which is incorporated herein by reference in its entirety.

FIELD OF THE INVENTION

The invention broadly relates to hydrogen separation from synthesis gas near STP.

BACKGROUND OF THE INVENTION

Hydrogen containing gas mixtures can be obtained by the incomplete combustion of biomass. Devices which support this operation are typically referred to as gasifiers. During World War II, a large number of small gasifiers were fabricated and installed on vehicles to provide a combustible gas stream to power the vehicle's internal combustion engine from biomass because gasoline was difficult to obtain. Today's emphasis on long term sustainability, including reducing carbon footprint and the increasing cost of fossil oil, is renewing interest in these gasifier-engine systems.

A typical small gasifier-engine combination operates by drawing air through the gasifier via the partial vacuum created in the engine's intake manifold. A range of parameters can be adjusted to supply a wide range of gasses to the engine. The gas stream will typically include nitrogen, carbon monoxide, hydrogen, carbon dioxide, and water vapor. The carbon monoxide and hydrogen are combustible, while the other gasses are diluents which generally reduce engine performance. Operating the gasifier with a high temperature in its char reducing region and supplying it with sufficient water will result in relatively high hydrogen concentrations, with very little water or carbon dioxide. For example, a gas stream including 30% nitrogen, 30% carbon monoxide and 30% hydrogen is possible.

Hydrogen has a wide variety of commercial uses beyond running the local engine. As such, it may be desirable to divert some of this hydrogen in concentrated form for other processes such as: (i) to hydrogenate biomass to liquid fuels, (ii) to make ammonia as a precursor to fertilizers, (iii) to provide a safe cooking and heating fuel for the developing world, and (iv) to power fuel cell and hydrogen compatible engines (the classic hydrogen economy).

SUMMARY OF THE INVENTION

Embodiments of the invention are directed toward hydrogen separation from synthesis gas near STP.

One embodiment of the invention is directed toward a hydrogen extraction and concentration system which can be inserted between a gasifier and an engine to divert some of its hydrogen while still maintaining a combustible gas stream to fuel the local engine. The hydrogen concentrator for concentrating the hydrogen stream comprises a filter, a pump, a membrane and a hydrogen compressor, wherein the membrane comprises a permselective membrane for permeating hydrogen from the gas stream.

DETAILED DESCRIPTION

In the following paragraphs, embodiments of the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Embodiments of the invention are directed toward a hydrogen separation membrane and a system to extract hydrogen from a synthesis gas stream.

Figure 1:
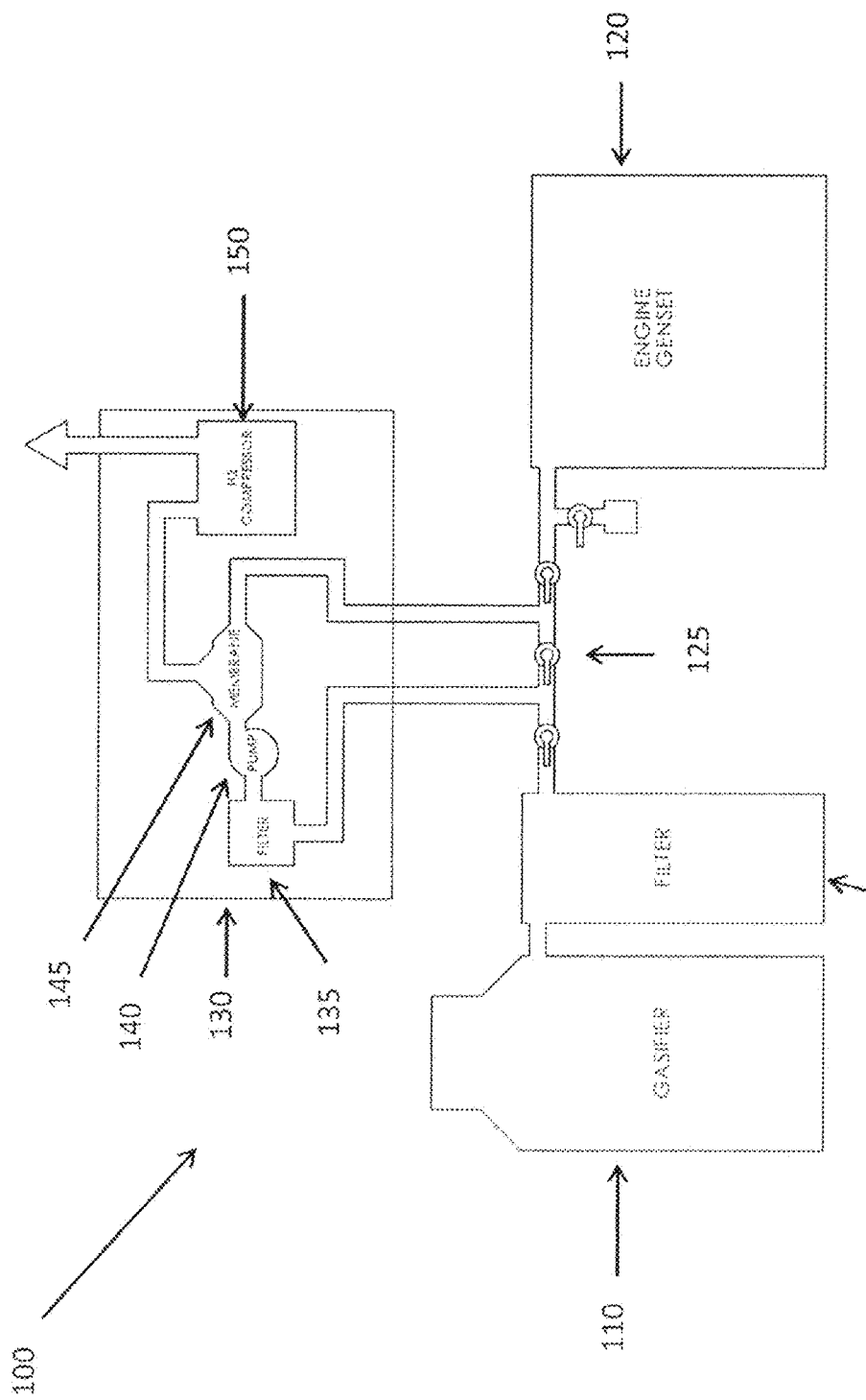
FIG. 1 is a diagram illustrating a system and method for extracting hydrogen from a gas stream between a small downdraft gasifier and its associated engine.

Referring to FIG. 1, one embodiment of the invention involves a system 100 and method for extracting hydrogen from a gas stream between a small downdraft gasifier 110 and its associated engine genset 120. By way of example, the engine genset 120 can include an engine used to run a generator and make electricity. In this embodiment, the gasifier 110 and/or engine genset 120 can be configured and commanded to produce a hydrogen stream while simultaneously producing electricity at a reduced output. The hydrogen stream from the gasifier 110 can be filtered using filter 115 before it is passed to the engine genset 120 or diverted to a hydrogen concentrator 130 by way of a bypass valve 125. As illustrated, the system 100 includes a hydrogen concentrator 130 comprises a filter 140, a pump 145, a membrane 150 and a hydrogen compressor 155. The membrane 150 in the hydrogen concentrator 130 is designed to concentrate hydrogen at low membrane cost and with minimal pumping energy in order to minimize the cost of the generated hydrogen (including minimizing the use of electricity for its production).

Figure 2:
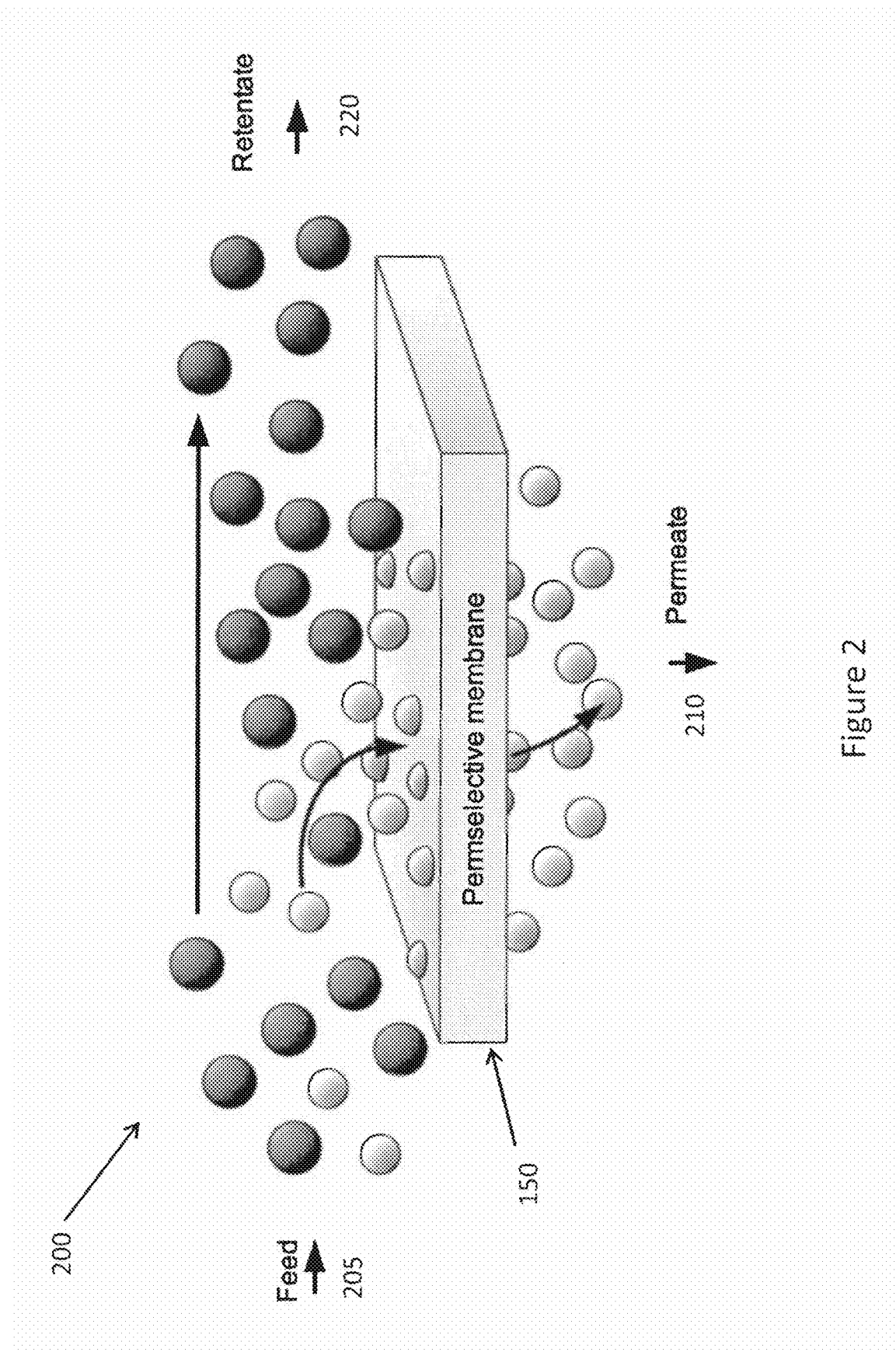
FIG. 2 is a diagram illustrating a permselective membrane that can be employed in the hydrogen concentrator illustrated in FIG. 1 in order to permeate hydrogen from the gas stream.

FIG. 2 is a diagram 200 illustrating a permselective membrane 150 that can be employed in the hydrogen concentrator 130 illustrated in FIG. 1 in order to permeate hydrogen (depicted by arrow 205) from the gas stream (depicted by arrow 200). This results in a hydrogen depleted retentate (depicted by arrow 220).

Figure 3:
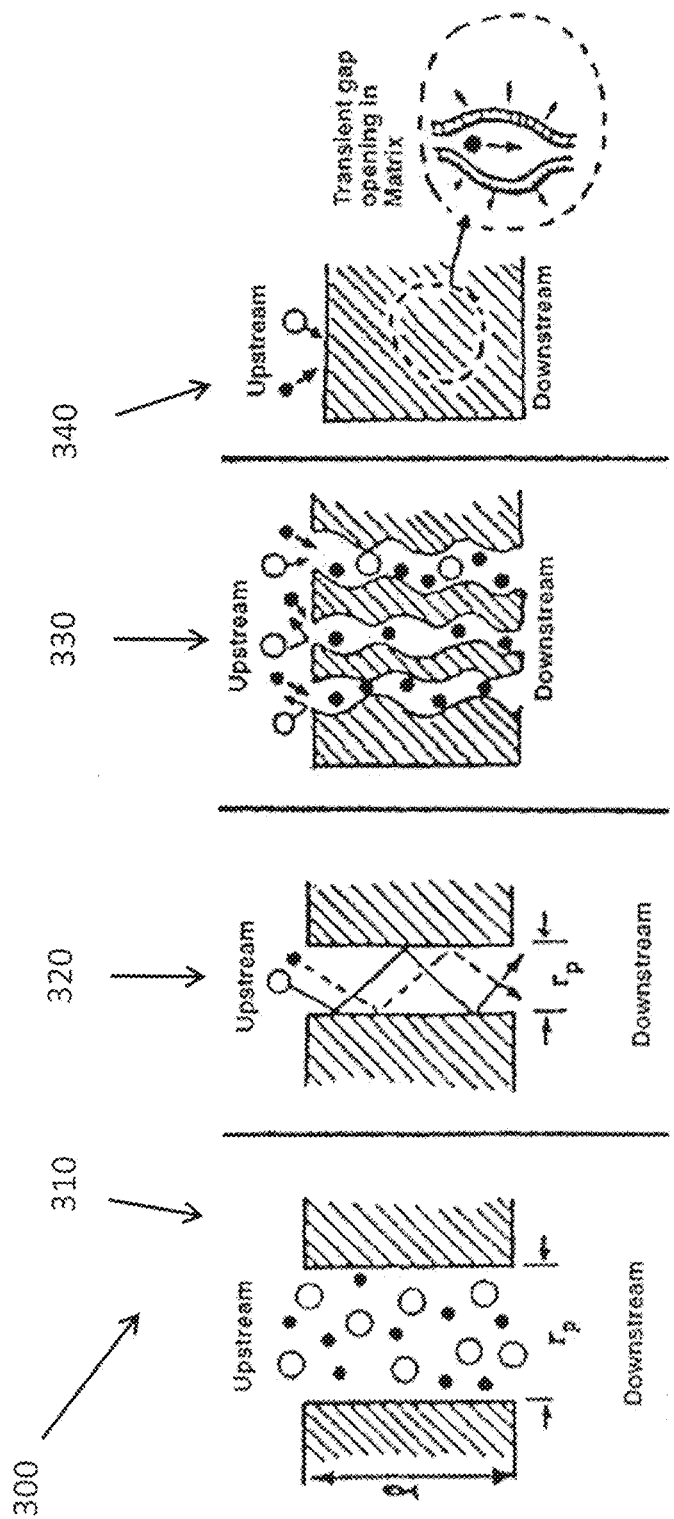
FIG. 3 is a diagram illustrating four generally recognized mechanisms by which such a membrane can operate.

FIG. 3 is a diagram 300 illustrating four generally recognized mechanisms by which such a membrane 150 can operate. Such mechanisms include a viscous flow 310, Knudson diffusion 320, molecular sieving 330, and solution diffusion 340. Embodiments of the invention utilize a novel combination of processed carbons with a TEFLON binder and an open mesh supporting substrate to provide a membrane 150 which utilizes all four mechanisms 310, 320, 330, 340 of FIG. 3 simultaneously.

Figure 4:
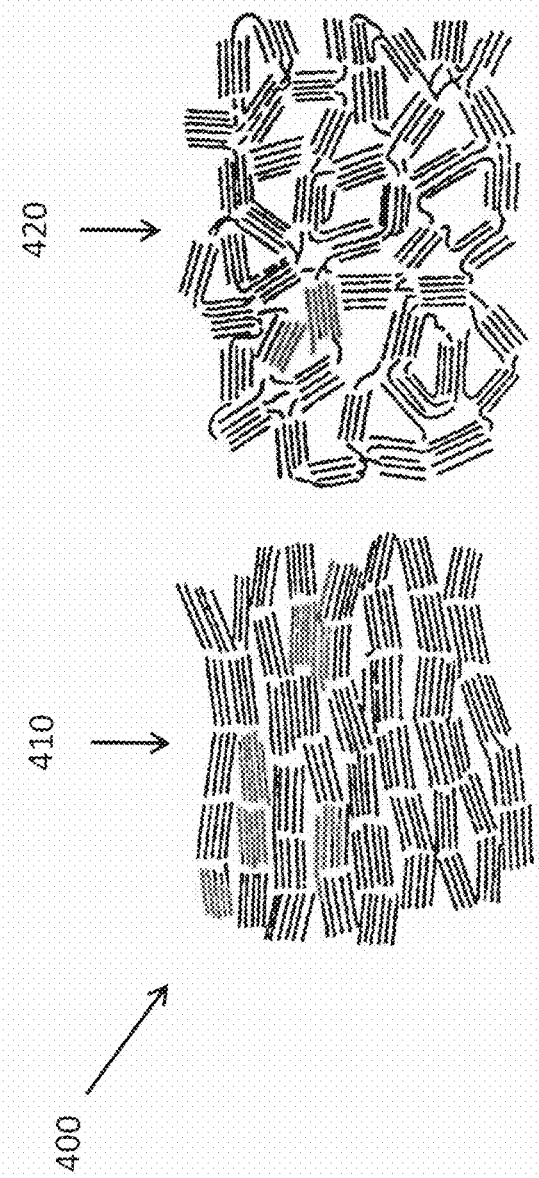
FIG. 4 is a diagram illustrating two basic types of carbon including graphitized carbon and non-graphitized carbon.

FIG. 4 is a diagram 400 illustrating two basic types of carbon including graphitized carbon 410 and non-graphitized carbon 420. Graphitized carbon 410 is very dense and offers a very low permeability to gasses. On the other hand, non-graphitized carbon 420 includes both amorphous phases and graphite planes.

Figure 5:
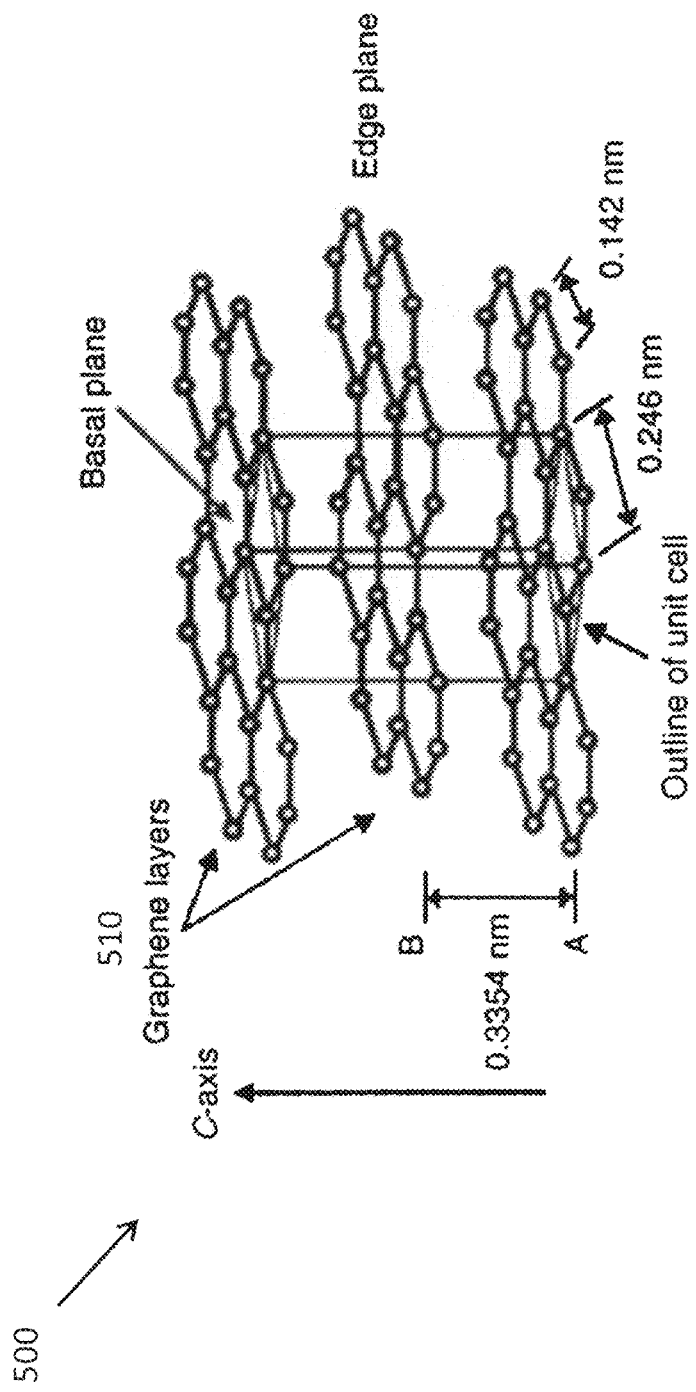
FIG. 5 is a diagram illustrating the structure of hexagonal graphite.

FIG. 5 is a diagram 500 depicting the structure of hexagonal graphite. The illustrated graphite planes, referred to as "graphene" layers 510, are capable of providing very small nanopores which can differentiate between various gas molecules. Table 1 (below) outlines the kinetic diameters of some relevant gasses.

TABLE 1

| Gas | Hydrogen | Carbon Dioxide | Nitrogen | Carbon Monoxide |
|---|---|---|---|---|
| Diameter, Angstroms | 2.60 | 3.30 | 3.64 | 3.76 |

Figure 6:
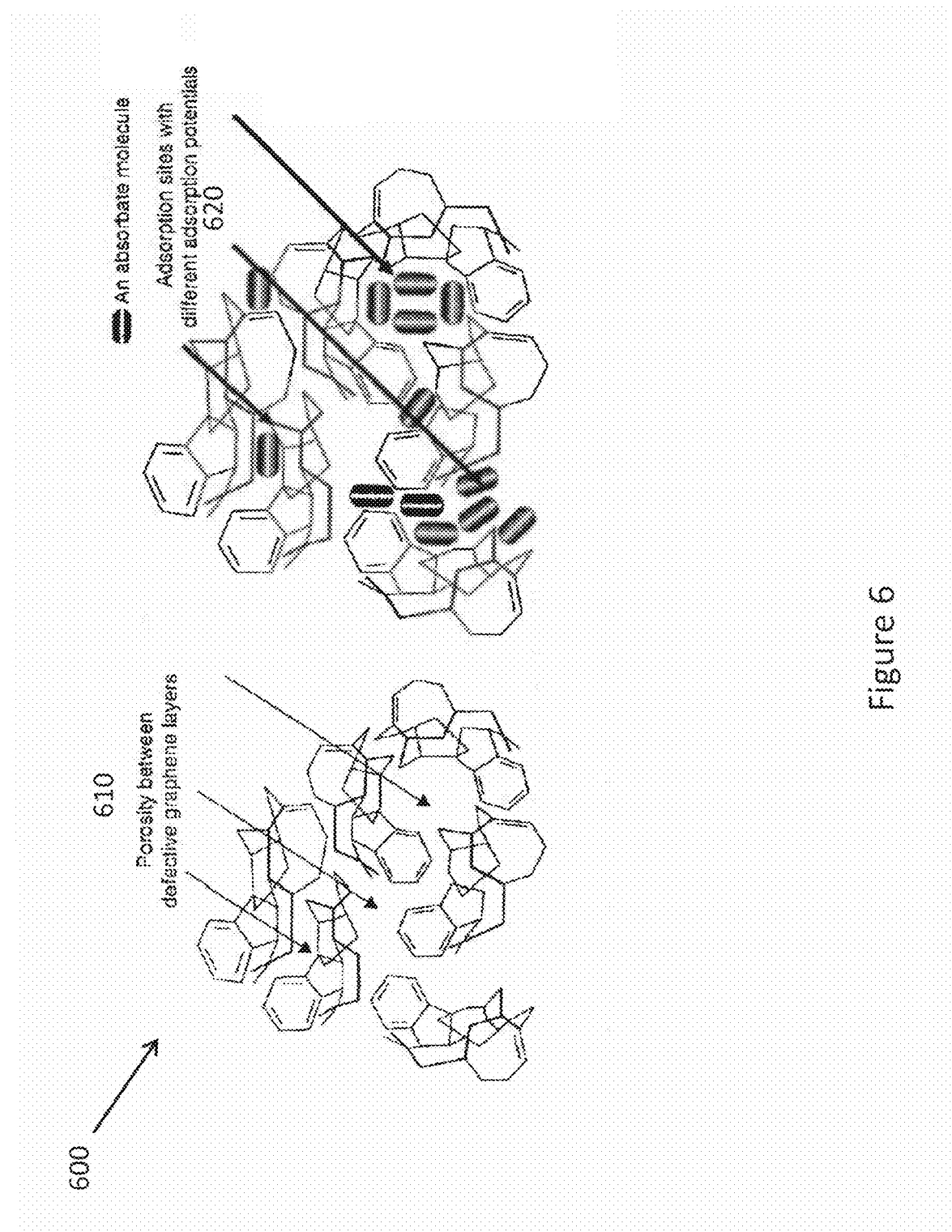
FIG. 6 is a diagram illustrating possible defective carbonaceous structures.

FIG. 6 is a diagram 600 illustrating possible defective carbonaceous structures which, when interconnected, create microporosity. Depending on the source of the carbon and how it has been processed, a carbonaceous structure can include defects within the graphene planes. The diagram 600 depicts porosity 610 between defective graphene layers and adsorption sites 620 with different adsorption potentials.

Figure 7:
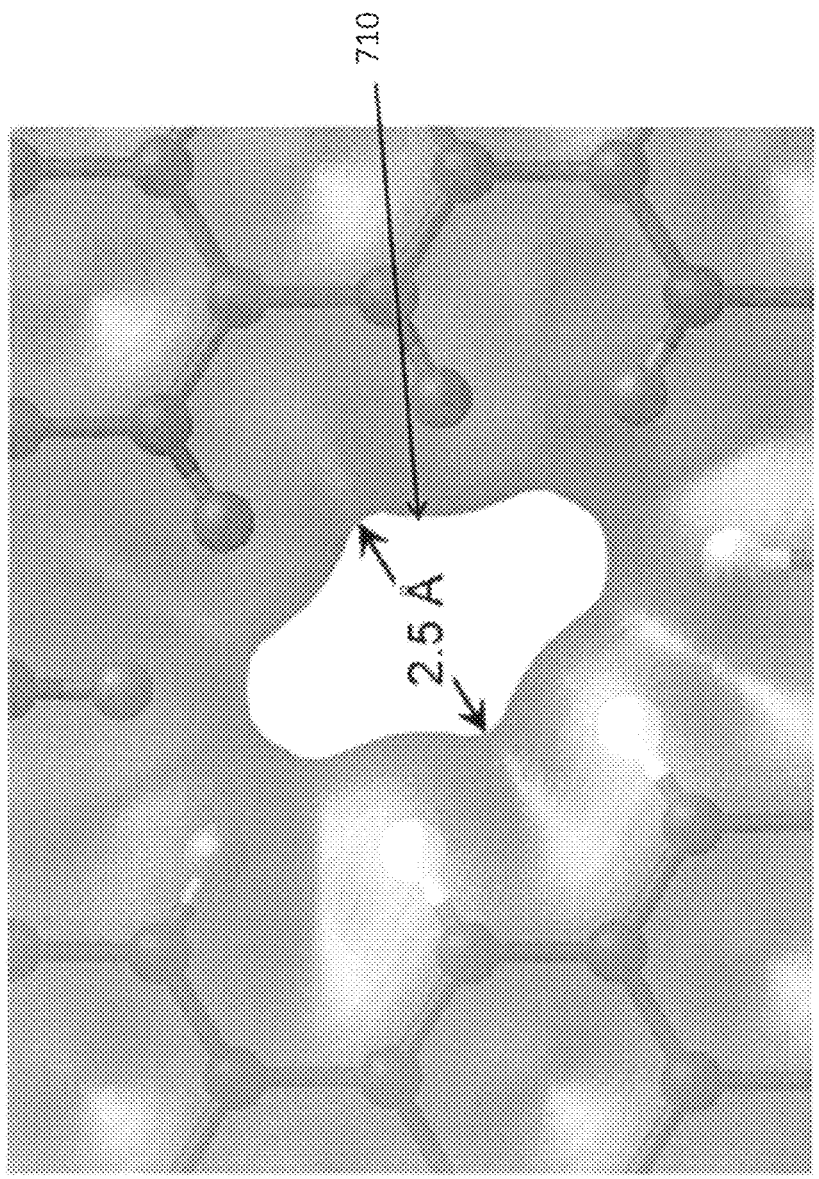
FIG. 7 is a diagram illustrating a sample defect in a carbonaceous structure.

FIG. 7 is a diagram 700 depicting a sample defect 710 in a carbonaceous structure. As illustrated, the basic lattice defect 710 in a graphene plane is about the same size (2.5 angstroms) as a hydrogen molecule and can therefore provide very high selectivity for hydrogen versus the other gasses in Table 1.

A porosity measurement system such as a Micromeretics ASAP 2020 can be used for Brunauer-Emmett-Teller (BET) analysis with nitrogen gas or carbon dioxide to determine the effective pore diameter and distribution in stable solids such as carbon powders. Carbon dioxide absorption is useful down to about 3 angstroms as seen in ZSM-5 zeolites and activated carbons. Some activated carbons indicate a large number of pores in the 3 angstrom region (which corresponds to FIG. 7 and the hydrogen diameter of Table 1). Per FIGS. 4 and 6, these small diameter pores are thought to be present as defects in randomly oriented graphene planes. Carbon precursors can be pyrolyzed to provide the desired nanopores. Alternatively, several commercially available carbons exhibit various concentrations of the desired pore structure. A complication is that a clean carbon surface has a strong affinity for oxygen including carbon dioxide and carbon monoxide. As a result, carbons which have been recently pyrolyzed can evolve their apparent pore distribution for months in open air. Alternatively, commercial carbons have typically been aged as part of the supply chain and are also available at very low cost as compared to a small scale pyrolysis process. Twenty year old carbon which was stored in open air was tested with satisfactory results. Commercial carbons of interest for this membrane include Cabot Vulcan and Black Pearls carbons, AkzoNobel Ketjenblack, Norit SX plus and Denka black.

With reference to FIG. 3, there are several diffusion mechanisms relevant in this situation. In practice, a porosity network must be formed which includes large pores to access the bulk of the membrane, intermediate pores which provide some degree of selectivity for small molecules and the highly desirable size specific pores for hydrogen, which can be as thin as one atom thick in a membrane that is more than $10^7$ atoms thick.

Bulk graphite has a density of 2, whereas some of these commercial carbons have apparent densities of only 0.01. In order to create a useful membrane, carbon(s) must be compacted and held in place to form a hierarchical network which statistically involves a significant number of hydrogen size specific pores (3 angstrom range). One approach is to use colloidal polytetrafluoroethylene (PTFE) as a binder via a process of compression and PTFE sintering to adhere the carbon matrix to the PTFE matrix. Fuel cell electrodes fabricated with this general technology have exhibited stability for decades. The resulting sintered membrane has some flexibility, but low tensile strength, so it should be fiber and/or screen reinforced. Suitable bulk materials include chopped fiberglass, or carbon fibers and screen substrates such as fiberglass, stainless steel, plated steel, brass, aluminum and various corrosion resistant alloys.

In some embodiments, the active membrane is molded around the screen substrate. However, this results in variable active thickness because of the dislocation of membrane material by the screen. Also water and oxidative gasses can affect the screen-membrane surface interface, particularly if a low corrosion resistance material such as brass or aluminum is used as the substrate. These issues can be overcome by adding a carbon gas diffusion layer around the screen substrate and then applying the gas selective membrane to this uniform surface. Suitable materials for the diffusion layer include highly graphitized carbons with relatively low surface areas which will retain macro-pores when compressed during the molding process. Cabot Vulcan XC500 with a surface area of about 75 meters$^2$/gram is an example of this type of carbon.

Such PTFE bound carbon membranes can be tuned over a wide range to accommodate various system constraints and operating cost tradeoffs. Some examples include adjustments for operating pressure such as thickness and distribution of carbon types as well as support screen strength. Hydrogen purity versus cost can be varied by membrane selectivity which is primarily a function of the distribution of pore sizes and connectivity within the membrane. Overall cost is a function of input materials cost, processing complexity, membrane sizing, and the required driving pressure gradient for separation. Overall electrode thickness can range from 0.015 inches to 0.1 inches with 0.030 inches typical for the active hydrogen permselective elements. Much higher thickness is possible if air filter components are incorporated in the surface of the membrane.

Metal oxides can be beneficially added to carbon electrodes to stabilize them against oxidation. Likewise, carbon membranes can benefit from protective oxide coatings. Such coatings interfere with the surface absorption and subsequent chemisorption of oxygen species in the pore structure. Silver, copper, cobalt, nickel and other metal salts can be chemically or thermally reduced in the carbon matrix and then oxidized by open air heating and/or normal operation. Such a treatment can extend the thermal operating range of the membrane by reducing the carbon's oxidation rate. PTFE softening and loss of structural strength becomes an issue above 150° C. Below that temperature, carbon tolerance to oxidation versus desired life expectancy is a key issue.

Example 1

Vulcan XC72R was mixed with DuPont PTFE dispersion (60% solids plus wetting agent) and distilled water at a 1:1:1 ratio. The resulting paste was rolled onto a 304 stainless steel screen (18×18 mesh, 0.009" wire). The paste was rolled to 0.13 grams/cm$^2$. The resulting wet electrode was placed in an inert atmosphere in a high temperature, high pressure sintering press. The temperature was ramped from ambient to 250° C. in 90 minutes and then cooled to 80° C. in one hour, before exposing to air. The pressure was ramped from 65 kg/cm$^2$ to 100 kg/cm² during the heat up. The resulting membrane is very dense, somewhat flexible, and generally durable by laboratory handling standards.

Example 1 Test Results

The membrane of Example 1 was clamped into a permselective membrane tester as per Diagram 2. The feed was 50% carbon dioxide and 50% hydrogen at about 0.1 bar above ambient (very lightly pressurized). The permeate side was above the membrane and open to air with a mass spectrometer sampling probe located 15 cm above the membrane. Selectivity was about 1000× hydrogen/carbon dioxide. Hydrogen flow under these very mild test conditions was 45 cm³/cm² of membrane surface per minute.

Example 2

A dual layer membrane was fabricated via a similar technique as Example 1 with the following exceptions: the base layer next to the substrate screen is a low surface area graphitized carbon similar to Vulcan XC500 (older version in lab inventory). The nano-porous layer was fabricated from an acetylene black similar to Denka Black, (older version in lab inventory) with a particle diameter in the 40 to 80 nm range. This layer was doped with 3% silver by weight as silver nitrate aqueous solution in the mixing process.

Example 2 Test Results

About a 25% improvement in hydrogen flow rate, but with over a 2× increase in manufacturing cost.

Operation of the overall system for extracting hydrogen illustrated in FIG. 1 will now be described. In order to extract hydrogen, the gasifier-engine system 100 is first brought to operating conditions. The bypass valve 125 is closed, routing the gasifier output through the hydrogen concentrator system 130 and then back to the engine where the remaining carbon monoxide and residual hydrogen is burned as fuel. The membrane 150 is set up with a feed and a permeate stream as illustrated in FIG. 2. A wide range of configurations are possible without departing from the scope of the invention, including stacking membranes 150 with alternate compartments for the feed and permeate or rolling the membranes 150 into tubes in a tube-and-shell configuration. Since the membrane 150 relies on nanopores for operation, additional gas stream filtering (e.g., using filter 115) may be appropriate to minimize fouling as indicated in FIG. 1.

Pressure management of the system for extracting hydrogen illustrated in FIG. 1 will now be described. The membrane 150 works by flowing gas from a higher pressure to a lower pressure. In the case of mixed gasses, the partial pressure of hydrogen on the input side will always be slightly higher than the permeate side. By way of example, if the input stream is 33% hydrogen, and an output stream of hydrogen at room pressure is desired, the input must be pressurized to at least 3 bar absolute, and substantially higher if most of the hydrogen is to be transferred to the permeate stream. Since the engine normally draws air through the gasifier 110 at slightly below atmospheric pressure, and the gas stream is only partially hydrogen, pressurizing that stream is very energy intensive. However, some configurations of the engine genset 120 rely on turbocharger boosting of the intake manifold to achieve full power. In such configurations, the pump 145 specified in FIG. 1 can be the standard turbocharger intake which can boost the gas pressure in the membrane 150 to 2 bar or more (absolute) on its way to the engine intake at minimal net increase in pumping energy as compared to the standard turbocharged engine configuration.

In order to extract a high percentage of the input hydrogen stream to the permeate stream, the hydrogen compressor 155 as indicated in FIG. 1 must generate a vacuum, ideally down to 0.1 bar absolute. The system can be further optimized by dividing the hydrogen separator membrane stack into two or more compartments. Each compartment's permeate stream can be serviced by its own smaller first stage vacuum pump. The hydrogen concentration entering the first stack is relatively high, (20 to 40% or more) such that a significant amount can be extracted with a modest vacuum. As the gas moves to successive compartments, the permeate stream must operate at successively higher vacuums to extract hydrogen. The optimal configuration of membrane surface area, compartmentalization and first stage pumping can vary widely based on application, and system economics such as desired capital amortization versus operating cost.

Example 3

A gasifier-engine genset with a 100 kW electrical rating is outfitted with a hydrogen separator system as described here. The engine displacement is 6 liters and operates at 1800 RPM with a standard intake cycle every two revolutions, thus, the engine draws 5400 liters of air/fuel mix per minute. For conventional synthesis gas mixtures, the ratio of synthesis gas to input air is about 1:1, so, the engine requires 2700 liters of gasifier output per minute. The gas stream contains 30% hydrogen and the separator system is targeting production of 20 SCFM hydrogen (560 liters/minute) or ⅔ of the available hydrogen. Assuming membrane performance equivalent to Example 1, 40 feet² (3.7 meters²) is arranged as 40 stacked membranes in 2 packs of 20 each, with an inter-membrane spacing ranging from 0.2 to 2 cm. This configuration can provide up to three times the required hydrogen flow (when new). The engine is turbo boosted to 2 bar absolute and the permeate stream is serviced by a vacuum pump/compressor with a 0.05 bar absolute limiting vacuum and a 150 SCFM free air rating. The hydrogen compressor draws under 10 kW. The system produces 3.4 kg of hydrogen per hour, which has an energy content of 113 kWh. Thus, the pumping energy is less than 10% of the hydrogen energy produced.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A system for extracting hydrogen from a gas stream between a downdraft gasifier and an associated engine genset, the system comprising:
   a bypass valve disposed between the gasifier and the engine genset for routing the gas stream through a hydrogen concentrator; and
   the hydrogen concentrator for concentrating the gas stream, the hydrogen concentrator comprising a filter for filtering the gas stream, a pump for pumping the gas stream through the hydrogen concentrator, a membrane formed from a bulk carbon which is compressed and held in form by sintered PTFE, and a hydrogen compressor;
   wherein the membrane comprises a permselective membrane for permeating hydrogen from the gas stream.

2. The system of claim 1, wherein the engine genset comprises an engine used to run a generator and make electricity.

3. The system of claim 1, wherein the gasifier or the engine genset is configured and commanded to produce a hydrogen stream while simultaneously producing electricity at a reduced output.

4. The system of claim 3, wherein the gas stream from the gasifier is filtered before it is passed to the engine genset or diverted to the hydrogen concentrator by way of the bypass valve.

5. The system of claim 1, where the hydrogen is separated from the gas stream which operates at a pressure of 0.1 bar absolute to 5 bar absolute and contains one or more gasses selected from the group consisting of: nitrogen, carbon monoxide, carbon dioxide, methane, and water.

6. The system of claim 1 where the permselective membrane is formed from a bulk carbon which is compressed and held in form by sintered PTFE and which includes a distribution of particle sizes from macroscopic (0.5 to 0.01 mm.) to 3 angstrom range graphene plane defects.

7. The system of claim 6, wherein the bulk carbon which is compressed and held in form by sintered PTFE has a low apparent density of 0.005 to 0.5 in bulk form and is compressed to an apparent density of 0.2 to 1.

8. The system of claim 7 where the sintered PTFE carbon membrane is 0.005 inch to 0.045 inch thick.

9. The system of claim 8, wherein the carbon PTFE membrane is further reinforced by the inclusion of bulk fibers selected from the group consisting of: carbon, graphite, fiberglass, and polymers.

10. The system of claim 8, wherein the carbon PTFE membrane is backed by a support screen made of fiberglass, metal, polymers or woven carbon or graphite fibers.

11. The system of claim 8, wherein the carbon PTFE membrane is backed by a support screen made of metal comprising at least one of stainless steel, plated steel, brass, aluminum and corrosion resistant alloy.

12. The system of claim 10, wherein the support screen is embedded in a coarse carbon PTFE matrix which has a large pore structure due to the use of low surface area carbon comprising 50 to 150 meters squared per gram, which is then press sintered on the permselective carbon PTFE layer.

13. The system of claim 7, wherein the permselective carbon is protected from oxidation by the inclusion of microscopically or nanoscopically distributed metals or metal oxide particles.

14. The system of claim 13, wherein the metals are selected from the group consisting of: silver, cobalt, nickel, vanadium, molybdenum, tungsten, copper, zinc, iron, and combinations thereof.

15. The system of claim 13, wherein the metal is silver, cobalt and nickel each loaded in the range of 0 to 0.02 grams per square centimeter of carbon PTFE membrane.

16. The system of claim 1, wherein the system is used to make electricity and biochar.

17. The system of claim 1, wherein the system is used to make electricity, biochar and hydrogen.

18. The system of claim 1, wherein a turbocharger mounted on the engine genset is used to boost the inlet gas pressure fed to the permselective membrane to above 1 bar pressure absolute.

19. The system of claim 1, wherein the system is used to power a fuel cell compatible engine or a hydrogen compatible engine.

\* \* \* \* \*